US012744879B2

(12) United States Patent
Lee et al.

(10) Patent No.: US 12,744,879 B2
(45) Date of Patent: Sep. 22, 2026

(54) LIGHT SOURCE DEVICE, TEST SYSTEM INCLUDING THE SAME, AND OPERATION METHOD THEREOF

(71) Applicant: SAMSUNG ELECTRONICS CO., LTD., Suwon-si (KR)

(72) Inventors: Sangwoo Lee, Suwon-si (KR); Dongoh Kim, Suwon-si (KR); Minhyuk Lee, Suwon-si (KR); Sungsu Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 181 days.

(21) Appl. No.: 18/462,384

(22) Filed: Sep. 6, 2023

(65) Prior Publication Data

US 2024/0129453 A1 Apr. 18, 2024

(30) Foreign Application Priority Data

Oct. 17, 2022 (KR) ........................ 10-2022-0133428
Feb. 16, 2023 (KR) ........................ 10-2023-0020879

(51) Int. Cl.
*H04N 17/00* (2006.01)
*H04N 17/02* (2006.01)
*H04N 23/56* (2023.01)

(52) U.S. Cl.
CPC ........... *H04N 17/002* (2013.01); *H04N 17/02* (2013.01); *H04N 23/56* (2023.01)

(58) Field of Classification Search
CPC ...... H04N 17/002; H04N 17/02; H04N 23/56; H04N 23/84; G01J 1/20; G03B 15/06; G03B 43/00; G01M 11/00; G01N 21/01; G01N 21/17; H05B 45/20
See application file for complete search history.

(56) References Cited

U.S. PATENT DOCUMENTS 7,522,280 B2 4/2009 Kang et al.
2003/0156194 A1* 8/2003 Sugiura ................ H04N 17/002 348/188
2006/0098096 A1* 5/2006 Gupta ....................... G01J 3/00 348/188

(Continued)

FOREIGN PATENT DOCUMENTS

JP 3657526 B2 * 6/2005 ............. H01L 27/14
JP 2009145226 A * 7/2009 ............ G01M 11/00

(Continued)

*Primary Examiner* — Kara E. Geisel
*Assistant Examiner* — Kaitlyn E Kidwell
(74) *Attorney, Agent, or Firm* — Morgan, Lewis & Bockius LLP

(57) ABSTRACT

Disclosed is a test system which includes a light source device. The light source device includes a first light source configured to radiate a first light, a plurality of neutral-density (ND) filters including a first ND filter attached to the first light source and configured to adjust the first light, an aperture unit including a plurality of apertures configured to adjust the first light received from the first ND filter and a diffuser configured to diffuse the first light received from the aperture unit and to radiate the first light for testing an image sensor, wherein an illuminance of the first light is adjusted based on a transmittance of the first ND filter and an aperture ratio of each of the apertures.

10 Claims, 10 Drawing Sheets

(56) References Cited

U.S. PATENT DOCUMENTS

| | | | | |
|---|---|---|---|---|
| 2008/0137945 | A1* | 6/2008 | Kang | G01J 1/28<br>382/167 |
| 2009/0244355 | A1* | 10/2009 | Horie | G02B 5/22<br>359/578 |
| 2013/0293726 | A1* | 11/2013 | Armstrong-Muntner | G01N 21/958<br>348/187 |
| 2017/0017135 | A1* | 1/2017 | Toriumi | H04N 23/75 |
| 2018/0052382 | A1* | 2/2018 | Themelis | G02B 21/361 |

FOREIGN PATENT DOCUMENTS

| | | | |
|---|---|---|---|
| JP | 4419265 | 2/2010 | |
| JP | 2012186165 | 9/2012 | |
| KR | 10-0762361 | 10/2007 | |
| KR | 10-2009-0041834 | 4/2009 | |
| KR | 10-1594258 | 2/2016 | |
| KR | 10-1629838 | 6/2016 | |
| KR | 10-1812235 | 12/2017 | |
| KR | 10-2097647 | 4/2020 | |
| KR | 102097647 B1 * | 4/2020 | H04N 17/002 |

* cited by examiner 1300
1310
1330
1320
Temperature Sensor
Illuminance Meter
Test Chart Display Device
TL2
A2
SL
A1
TL1
CS
CI

Figure 3:
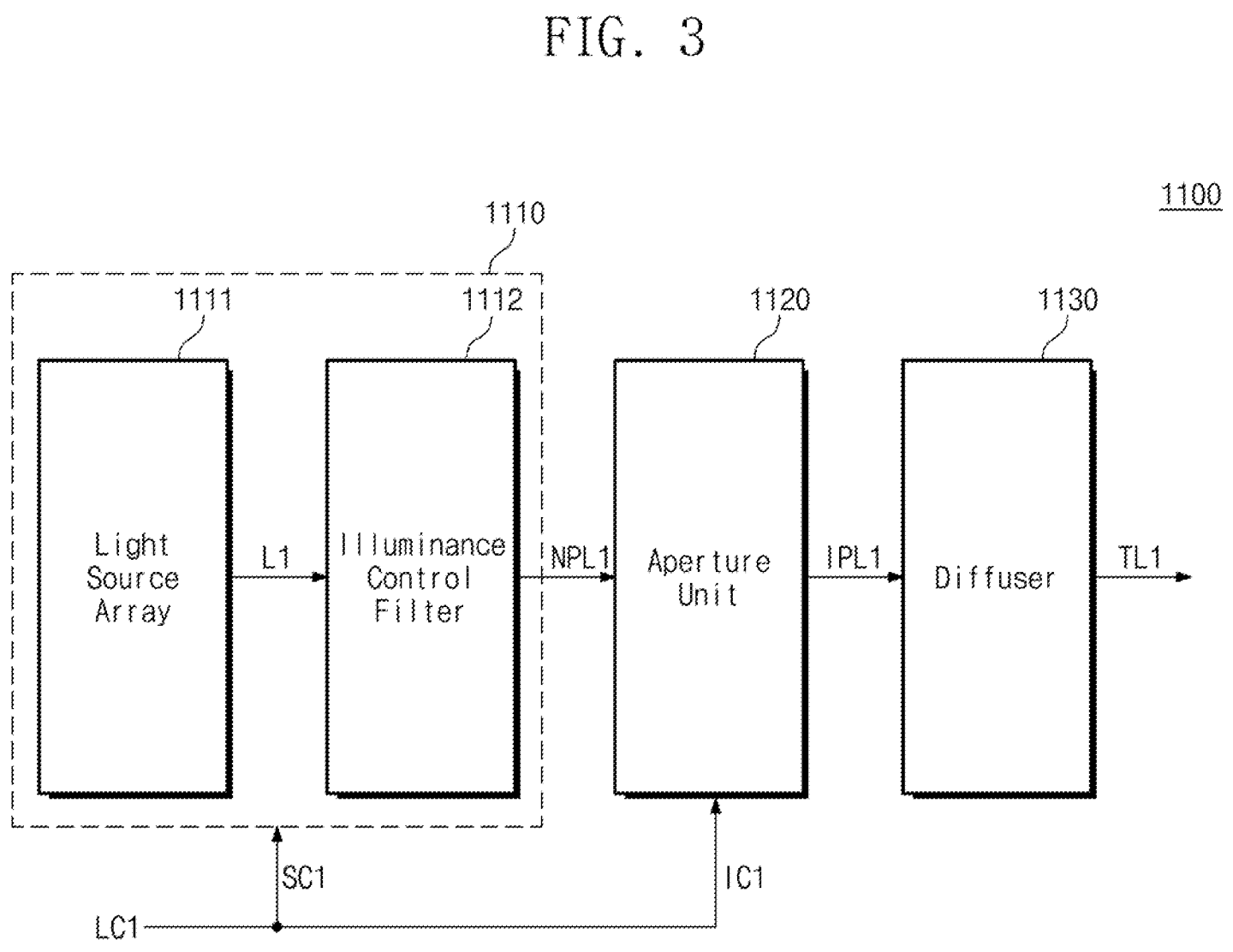

1111 Light Source Array

L1

1112 Illuminance Control Filter

NPL1

1120 Aperture Unit

IPL1

1130 Diffuser

TL1

LC1

SC1

IC1

1112a
F5
F4
F3
F2
F1
S3
S2
S4
R1
S1
NPL1
S5
1111a

FIG. 7

| Exposure Factor (ND X) | Transittance | F-stop Reduction |
|---|---|---|
| 1 | 100% | 0 |
| 1.3 | 75% | 1/3 |
| 1.4 | 70% | 1/2 |
| 1.5 | 67% | 2/3 |
| 2 | 50% | 1 |
| 2.5 | 40% | $1_{1/3}$ |
| 3 | 33% | $1_{2/3}$ |
| 4 | 25% | 2 |
| 8 | 12.5% | 3 |
| 10 | 10% | $3_{1/3}$ |
| 16 | 6.25% | 4 |
| 32 | 3.125% | 5 |
| 64 | 1.563% | 6 |
| 100 | 1% | $6_{2/3}$ |
| 128 | 0.781% | 7 |
| 256 | 0.391% | 8 |
| 512 | 0.195% | 9 |
| 1024 | 0.1% | 10 |

| L1 | ND filter | NPL1 | Iris f number | | IPL1 |
|---|---|---|---|---|---|
| 1000Lux | F1 | 700Lux | Even | 4~5.6 | 600Lux~700Lux |
| | | | Odd | 4 | |
| | F2 | 750Lux | Even | 2~4 | 700Lux~750Lux |
| | | | Odd | 2~4 | |
| | F3 | 1000Lux | Even | 2~4 | 750Lux~849Lux |
| | | | Odd | 2 | |

LIGHT SOURCE DEVICE, TEST SYSTEM INCLUDING THE SAME, AND OPERATION METHOD THEREOF

CROSS-REFERENCE TO RELATED APPLICATIONS

This application claims priority under 35 U.S.C. § 119 to Korean Patent Application No. 10-2022-0133428, filed on Oct. 17, 2022, in the Korean Intellectual Property Office, and Korean Patent Application No. 10-2023-0020879, filed on Feb. 16, 2023, in the Korean Intellectual Property Office, the disclosures of which are incorporated by reference herein in their entireties.

TECHNICAL FIELD

Embodiments of the present disclosure described herein relate to a test system, and more particularly, to a light source device for evaluating an image sensor, a test system including the light source device, and an operation method thereof.

DISCUSSION OF RELATED ART

Typically, an image sensor converts a light received from an outside environment into an electrical signal. The image sensor may be classified as a complementary metal-oxide-semiconductor (CMOS) image sensor or a charge coupled device (CCD) image sensor.

The image sensor may receive light reflected off an object and detect a color of the object. The color detected by the image sensor may be a mixed color that may be the result of an actual color of the object mixing with a color of a light source shined on the object.

Color mixing may occur when two or more colors blend together, for example, through an interaction of light waves. In the case of the object that has an actual color, a color of a light source shined on the object and the actual color of the object may be mixed. The color of the object and the color of the light source may mix in different ways depending on the properties of the object and the characteristics of the light.

While human vision may be adept at detecting the actual the color of the object, even when color mixing has occurred, the image sensor may not accurately detect the actual color of the object.

SUMMARY

Embodiments of the present disclosure provide a light source device with improved performance, a test system including the same, and an operation method thereof.

According to an embodiment, a test system for an image sensor includes a first light source device that radiates a first test light based on a first control signal, a chart changer, an image sensor that obtains image information based on the first test light reflected by the chart changer, a power provider that supplies a power to the first light source device, and a control circuit that generates the first control signal and the second control signal. The first light source device includes a first light source that radiates the first test light, a plurality of neutral-density (ND) filters, including a first ND filter disposed to adjust an illuminance of the first test light, and an aperture unit, including a plurality of apertures, configured to adjust the illuminance of the first test light received from the first ND filter based on an aperture ratio of each of the plurality of apertures. Wherein, the illuminance of the first test light is adjusted independent of the power supplied to the first light source device by the power provider.

According to an embodiment, a light source device includes a first light source radiating a first light, a plurality of neutral-density (ND) filters that includes a first ND filter attached to the first light source and configured to adjust the first light, an aperture unit including a plurality of apertures configured to adjust the first light received from the first ND filter, and a diffuser configured to diffuse the first light received from the aperture unit and to radiate the first light for testing an image sensor. Illuminance of the first light is adjusted based on a transmittance of the first ND filter and an aperture ratio of each of the apertures.

According to an embodiment, a method of operating an image sensor test system which includes a light source device radiating a test light includes activating a first light source among a plurality of light sources included in the light source device, based on a target color temperature, placing a first neutral-density (ND) filter among a plurality of ND filters attached to the first light source at a first position where the test light is radiated, based on a target illuminance, adjusting an aperture ratio of each of a plurality of apertures included in the light source device, based on the target illuminance, and adjusting a position of the light source device, based on the target illuminance. While the light source device radiates the test light of the target color temperature, a magnitude of a power supplied to the light source device is uniformly maintained.

BRIEF DESCRIPTION OF THE FIGURES

The above and other objects and features of the present disclosure will become apparent by describing in detail embodiments thereof with reference to the accompanying drawings.

FIG. 3 is a diagram illustrating a partial configuration of a light source device of FIG. 1 according to an embodiment of the present disclosure.

FIG. 7 is a table for describing examples of an ND filter of FIG. 5 according to an embodiment of the present disclosure.

DETAILED DESCRIPTION

Below, embodiments of the present disclosure will be described in detail and to such an extent that one skilled in the art may carry out the present disclosure.

In the detailed description, components described using the terms "unit", "module", "block", "~er or ~or", etc., and with reference to function blocks illustrated in drawings, may be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
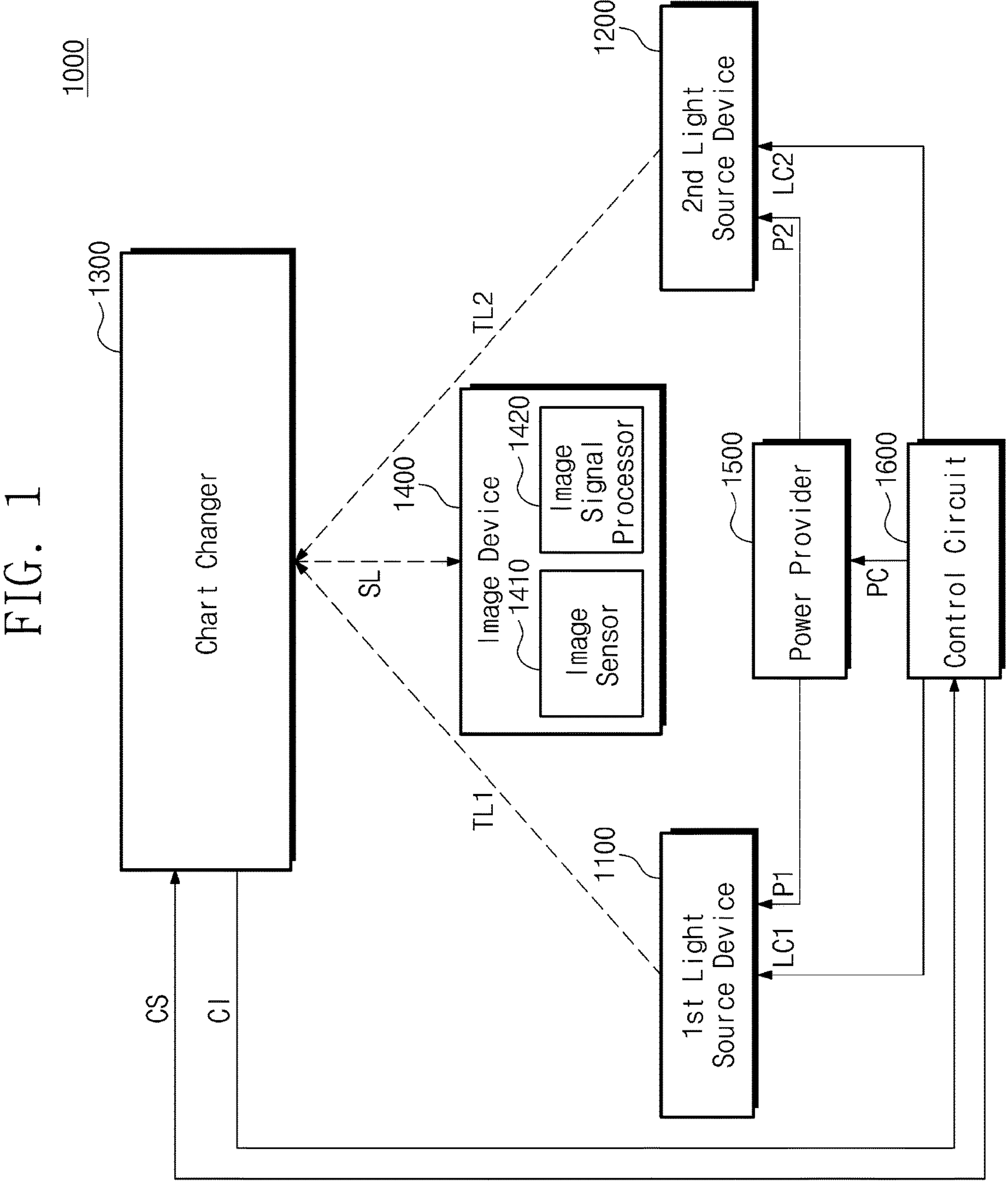
FIG. 1 is diagram for describing a test system according to an embodiment of the present disclosure.

FIG. 1 is diagram for describing a test device according to an embodiment of the present disclosure. Referring to FIG. 1, a test system 1000 may include a first light source device 1100, a second light source device 1200, a chart changer 1300, an image device 1400, a power provider 1500, and a control circuit 1600.

In an embodiment, the test system 1000 may refer to a system for testing a characteristic and image quality of the image device 1400. For example, a test may be performed to determine whether the image device 1400 accurately recognizes color information of an object. The test may determine whether the image device 1400 accurately recognizes color information of the object in environments with changing illuminance and color temperature. The test may be performed while individually changing a color temperature and an illuminance of a signal light SL input to the image device 1400.

The test may include one or more steps. For example, the test may include a first test step and a second test step. At the first test step, the test may be performed in an illuminance-changing environment, with the color temperature of the signal light SL input to the image device 1400 maintained at certain color temperature, such as 6500K. Afterwards, at the second test step the color temperature of the signal light SL input to the image device 1400 may be changed to another color temperature, such as 5000K, and the test may be performed in an illuminance-changing environment, with the color temperature of the signal light SL input to the image device 1400 maintained at 5000K. Embodiments of the present disclosure are not limited thereto. For example, the test may include more test steps.

The first light source device 1100 may radiate a first test light TL1 to the chart changer 1300. The first light source device 1100 may control the illuminance of the first test light TL1, based on a first light source control signal LC1. The first light source device 1100 may control the color temperature of the first test light TL1, based on the first light source control signal LC1. The adjustment of the illuminance and the color temperature the first test light TL1 by the first light source device 1100 will be described in detail herein.

In an embodiment, based on a direction in which the first test light TL1 is radiated, the first light source device 1100 may move farther from the chart changer 1300 or may move closer to the chart changer 1300. The first light source device 1100 is movable relative to the chart changer 1300 based on the first light source control signal LC1. For example, as the first light source device 1100 becomes closer to the chart changer 1300, the illuminance of the first test light TL1 input to the chart changer 1300 may increase as a function of a distance between the first light source device 1100 and the chart changer 1300. In this case, the illuminance of the signal light SL input to the image device 1400 may increase. For example, as the first light source device 1100 becomes more distant from the chart changer 1300, the illuminance of the first test light TL1 input to the chart changer 1300 may decrease as a function of the distance between the first light source device 1100 and the chart changer 1300. In this case, the illuminance of the signal light SL input to the image device 1400 may decrease.

The second light source device 1200 may radiate a second test light TL2 to the chart changer 1300. The second light source device 1200 may control the illuminance of the second test light TL2, based on a second light source control signal LC2. The second light source device 1200 may control the color temperature of the second test light TL2, based on the second light source control signal LC2. The adjustment of the illuminance and the color temperature of the second test light TL2 by the second light source device 1200 will be described in detail herein.

In an embodiment, based on a direction in which the second test light TL2 is radiated, the second light source device 1200 may move farther from the chart changer 1300 or may move closer to the chart changer 1300. The second light source device 1200 is movable relative to the chart changer 1300 based on the second light source control signal LC2. For example, as the second light source device 1200 becomes closer to the chart changer 1300, the illuminance of the second test light TL2 input to the chart changer 1300 may increase as a function of a distance between the second light source device 1200 and the chart changer 1300. In this case, the illuminance of the signal light SL input to the image device 1400 may increase. For example, as the second light source device 1200 becomes more distant from the chart changer 1300, the illuminance of the second test light TL2 input to the chart changer 1300 may decrease as a function of the distance between the second light source device 1200 and the chart changer 1300. In this case, the illuminance of the signal light SL input to the image device 1400 may decrease.

In other words, the test system 1000 may adjust the illuminance of the signal light SL input to the image device 1400 by adjusting a position the first light source device 1100 and a position of the second light source device 1200. More particularly, the test system 1000 may adjust the illuminance of the signal light SL input to the image device 1400 by adjusting a position the first light source device 1100 and a position of the second light source device 1200 with respect to the chart changer 1300

In an embodiment, the color temperature and illuminance of the first test light TL1 may be identical to the color temperature and illuminance of the second test light TL2. Alternatively, the color temperature and illuminance of the first test light TL1 may be different from the color temperature and illuminance of the second test light TL2.

The chart changer 1300 may include a display device (not illustrated in FIG. 1). The display device of the chart changer 1300 may display a test chart. The display device of the chart changer 1300 may display a test chart that may reflect at least one of the first test light TL1 and the second test light TL2. The first test light TL1 and the second test light TL2 may be reflected by the chart changer 1300. The reflected light may be input to the image device 1400. As such, the illuminance and color temperature of the signal light SL input to the image device 1400 may be determined, at least in part, based on the illuminance and color temperature of the first test light TL1 and the illuminance and color temperature of the second test light TL2.

The image device 1400 may include an image sensor 1410 and an image signal processor 1420. For example, the image device 1400 may be included in a computing system such as a desktop computer, a laptop computer, a smartphone, a wearable device, a black box, or a digital camera.

The image sensor 1410 may output image data based on the signal light SL input to the image device 1400. For example, the image sensor 1410 may include a plurality of pixels. Each of the plurality of pixels may be configured to output an electrical signal corresponding to the light incident on the image sensor 1410 from the outside. The image sensor 1410 may output the image data based on the electrical signal. In an embodiment, the image data output from the image sensor 1410 may include image information about a specific frame, such as brightness information and color information.

The image signal processor 1420 may receive the image data from the image sensor 1410. The image signal processor 1420 may perform various signal processing operations on the received image data. For example, the image signal processor 1420 may perform noise cancellation, white balancing, gamma correction, color correction, or color transformation on the received image data. The signal-processed image data may be transferred to an external device (e.g., a display device) or may be stored in a separate storage device. A user of the test system 1000 may view the signal-processed image data. Having viewed the signal processed image data, the user of the test system 1000 may determine whether the image sensor 1410 accurately recognizes a color of the object in a specific-illuminance and specific-color temperature environment.

The power provider 1500 may supply a first power P1 to the first light source device 1100, based on a power control signal PC. For example, the power provider 1500 may supply the first power P1 and the first light source device 1100 may radiate the first test light TL1.

The power provider 1500 may supply a second power P2 to the second light source device 1200, based on the power control signal PC. For example, the power provider 1500 may supply the second power P2 and the second light source device 1200 may radiate the second test light TL2.

In some embodiments, the power provider 1500 may decrease a magnitude of the first power P1 based on the power control signal PC. With the decrease in the magnitude of the first power P1, the illuminance of the first test light TL1 may decrease. That is, the test system 1000 may control the magnitude of the first power P1 to adjust the illuminance of the first test light TL1.

The color temperature of the first test light TL1 may be determined based on a color temperature characteristic of a light source of the first light source device 1100. For example, the light source of the first light source device 1100 may be implemented with a halogen lamp having a color temperature characteristic of 6500K. To decrease the illuminance of the first test light TL1, the test system 1000 may decrease the magnitude of the first power P1. In this case, in the consideration of the characteristic(s) of the halogen lamp, as the magnitude of the first power P1 decreases, the color temperature of the light radiated by the light source of the first light source device 1100 may decrease. As such, the color temperature of the first test light TL1 may decrease. That is, as the magnitude of the first power P1 decreases, the illuminance and color temperature of the first test light TL1 may be changed together.

The test of the image device 1400 may be performed to obtain an image quality evaluation result. The image quality evaluation result may be generated according to a color temperature change and an illuminance change. According to some embodiments, the image device 1400 may be accurately tested by performing the test while changing only the illuminance of a light having a specific color temperature. In the case where the test system 1000 adjusts the illuminance by adjusting the magnitudes of the first power P1 and the second power P2 respectively input to the first light source device 1100 and the second light source device 1200, it may be difficult to accurately test the image device 1400.

Also, as the test system 1000 adjusts the magnitudes of the first power P1 and the second power P2 respectively input to the first light source device 1100 and the second light source device 1200, the burden of the light source of the first light source device 1100 and the light source of the second light source device 1200 may increase. In this case, a lifetime of the light source of the first light source device 1100 and the light source of the second light source device 1200 may be shortened.

The test system 1000 according to an embodiment of the present disclosure may adjust the illuminance of the first test light TL1 and the illuminance of the second test light TL2 in a state where the magnitude of the first power P1 and the magnitude of the second power P2 respectively input to the first light source device 1100 and the second light source device 1200 are maintained. In this case, the test system 1000 may adjust the illuminance of the first test light TL1 and the second test light TL2, with the color temperatures of the test lights TL1 and TL2 maintained. Accordingly, the image device 1400 may be accurately tested by using the test system 1000 according to an embodiment of the present disclosure.

According to an embodiment of the present disclosure, the test system 1000 may uniformly maintain the magnitudes of the first power P1 and the second power P2 for the first test light TL1 and the second test light TL2, the lifetime of the light source of the first light source device 1100 and the light source of the second light source device 1200 may be extended.

The control circuit 1600 may generate control signals for controlling the first light source device 1100, the second light source device 1200, the chart changer 1300, and the power provider 1500. The control circuit 1600 may transmit a chart control signal CS to the chart changer 1300. The control circuit 1600 may receive a chart information signal CI from the chart changer 1300. The control circuit 1600 may transmit the first light source control signal LC1 to the first light source device 1100 and may transmit the second light source control signal LC2 to the second light source device 1200. The control circuit 1600 may transmit the power control signal PC to the power provider 1500.

The chart information signal CI transmitted to the control circuit 1600 may include illuminance and color temperature information for each of the first test light TL1 and the second test light TL2. The control circuit 1600 may recognize the illuminance and color temperature of the first test light TL1 and the illuminance and color temperature of the second test light TL2 based on the chart information signal CI received from the chart changer 1300. When the illuminance and the color temperature of each of the first test light TL1 and the second test light TL2 are different from a target illuminance and a target color temperature, the control circuit 1600 may adjust the illuminance and the color temperatures of the first test light TL1 and the second test light TL2, based on the first light source control signal LC1 and the second light source control signals LC2.

Figure 2:
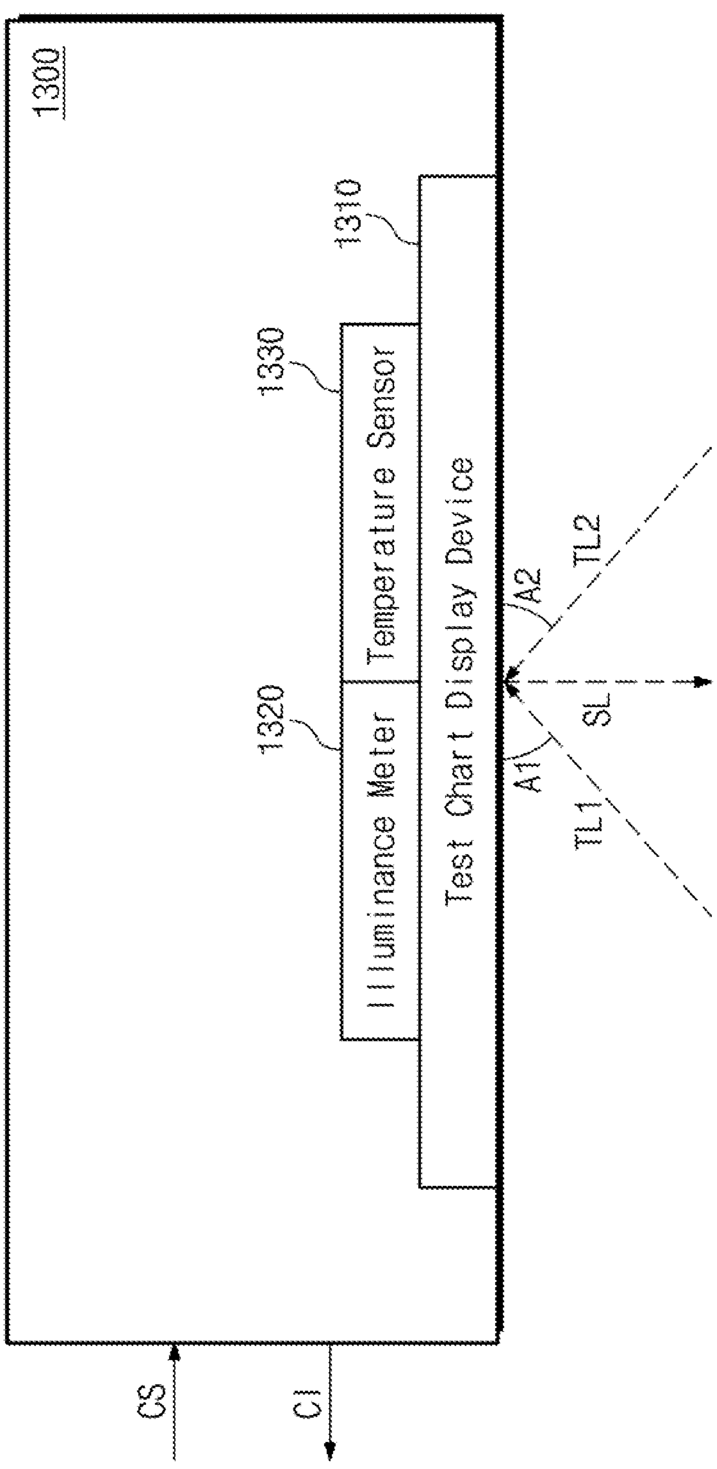
FIG. 2 is a diagram illustrating a chart changer of FIG. 1 according to an embodiment of the present disclosure.

FIG. 2 is a diagram illustrating the chart changer 1300 of FIG. 1 in detail. FIG. 2 may be described with reference to FIG. 1. Referring to FIG. 2, the chart changer 1300 may include a test chart display device 1310, an illuminance meter 1320, and a temperature sensor 1330.

The first test light TL1 may be incident onto the chart changer 1300 at a first incidence angle A1. The second test light TL2 may be incident onto the chart changer 1300 at a second incidence angle A2. In an embodiment, each of the first incidence angle A1 and the second incidence angle A2 may be 45 degrees. The first test light TL1 and the second test light TL2 may be reflected by the chart changer 1300. The first test light TL1 and the second test light TL2 may be reflected by the chart changer 1300 toward the image device 1400 and form the signal light SL. The signal light SL may be input to the image device 1400. The illuminance and color temperature of the signal light SL input to the image device 1400 may be determined based on the illuminance and color temperature of the first test light TL1 and the illuminance and color temperature of the second test light TL2.

The test chart display device 1310 may refer to a device that displays a test chart. The test chart may be an image displayed for evaluating the image device 1400. The test chart may be a resolution chart, a signal-to-noise ratio (SNR) chart, a gamma chart, a white chart, a color bar, or a Macbeth chart. The chart changer 1300 may display the test chart suitable for a test purpose in the test chart display device 1310. The test chart may be displayed by the test chart display device 1310 based on the chart control signal CS.

The illuminance meter 1320 may measure the illuminance of the first test light TL1 and the illuminance of the second test light TL2. The temperature sensor 1330 may measure the color temperature of the first test light TL1 and the color temperature of the second test light TL2.

The chart changer 1300 may transmit the chart information signal CI to the control circuit 1600. The chart information signal CI may include information about the test chart displayed by the test chart display device 1310 and the illuminance and color temperature of each of the first test light TL1 and the second test light TL2. For example, the chart information signal CI may include information about a kind of test chart to be displayed by the test chart display device 1310.

FIG. 3 is a diagram illustrating a partial configuration of a light source device of FIG. 1 according to some embodiments. For convenience of description and for brevity of drawing, FIG. 3 will be described with reference to the first light source device 1100 of FIG. 1. The second light source device 1200 of FIG. 1 may have the same structure as the first light source device 1100 of FIG. 3.

Referring to FIG. 3, the first light source device 1100 may include a light source unit 1110, an aperture unit 1120, and a diffuser 1130. The first light source device 1100 may receive the first light source control signal LC1 from the control circuit 1600. The first light source control signal LC1 may include a first light control signal SC1 and a first aperture control signal IC1.

The light source unit 1110 may include a light source array 1111 and an illuminance control filter unit 1112. The light source array 1111 may include a plurality of light sources. For example, at least one of the plurality of light sources of the light source array 1111 may be activated based on the first light control signal SC1. An activated light source may radiate a first light L1 having a specific color temperature based on a unique color temperature characteristic. The first light source device 1100 may adjust the color temperature of the first light L1 based on the first light control signal SC1. The color temperature of the first test light TL1 may be determined based on the color temperature of the first light L1.

The illuminance control filter unit 1112 may include a plurality of illuminance control filters. The plurality of illuminance control filters may be respectively attached to a corresponding light source among the plurality of light sources of the light source array 1111. For example, a first illuminance control filter may be attached to the first light source, and a second illuminance control filter may be attached to the second light source.

Each of the plurality of illuminance control filters of the illuminance control filter unit 1112 may include a plurality of neutral-density (ND) filters. Each of the plurality of ND filters may be a filter that reduces or modifies the intensity of all wavelengths or colors of incident light equally. As such, each of the plurality of ND filters may adjust the amount of light emitted from the light source unit 1110 while maintaining a color balance of the incident light.

For example, the first light L1 may pass through the first ND filter among the plurality of ND filters of the illuminance control filter attached to the light source that radiates the first light L1. As such, the amount of first light emitted from the light source unit 1110 may be adjusted. In this case, a light NPL1 passing through the illuminance control filter unit 1112 and emitted from the light source unit 1110 may mean a light that is obtained by adjusting the amount of first light L1 through the first ND filter. The plurality of ND filters may be described in detail with reference to FIG. 5.

The aperture unit 1120 may include a plurality of apertures. The first light source device 1100 may control an aperture ratio of each of the plurality of apertures based on the first aperture control signal IC1. In the above example, the light NPL1 passing through the first ND filter may pass through the aperture unit 1120. The illuminance of a light IPL1 passing through the aperture unit 1120 may be determined based on the aperture ratio of each of the plurality of apertures.

In an embodiment, as the aperture ratio of each aperture is adjusted, the area through which the light IPL1 may pass through the aperture unit 1120 may be adjusted. For example, an amount of the light IPL1 passing through the aperture unit 1120 may be decreased.

The light IPL1 emitted by the aperture unit 1120 may pass through the diffuser 1130. The diffuser 1130 may scatter the light IPL1 emitted by the aperture unit 1120. The diffuser 1130 may evenly diffused the light IPL1 as the first test light TL1. As such, the uniformity of the light IPL1 that passes through the diffuser 1130 may be increased. The light that passes through the diffuser 1130 and has its uniformity increased is the first test light TL1.

As described above, the first light source device 1100 according to an embodiment of the present disclosure may adjust the color temperature and illuminance of the first test light TL1, based on the first light source control signal LC1. The illuminance of the first test light TL1 may be adjusted based on the illuminance control filter unit 1112. The illuminance of the first test light TL1 may be adjusted based on the aperture ratio of each of the plurality of apertures of the aperture unit 1120. As the illuminance of the first test light TL1 is adjusted, the illuminance of the signal light SL input to the image device 1400 may be adjusted. The illuminance of the signal light SL input to the image device 1400 may be adjusted based on a position of the first light source device 1100.

In an embodiment, while the illuminance of the first test light TL1 may be adjusted in the above manner, the first power P1 that is supplied to the first light source device 1100 may be uniformly maintained. That is, the first light source device 1100 according to an aspect of the present disclosure may adjust the illuminance of the first test light TL1 in a state where the supplied power is uniform. Accordingly, the test system 1000 capable of adjusting the illuminance, independent of a color temperature characteristic of the light source may be provided. In other words, the test system 1000 capable of adjusting only the illuminance, without changing a color temperature of a light having a specific color temperature may be provided.

Figure 4:
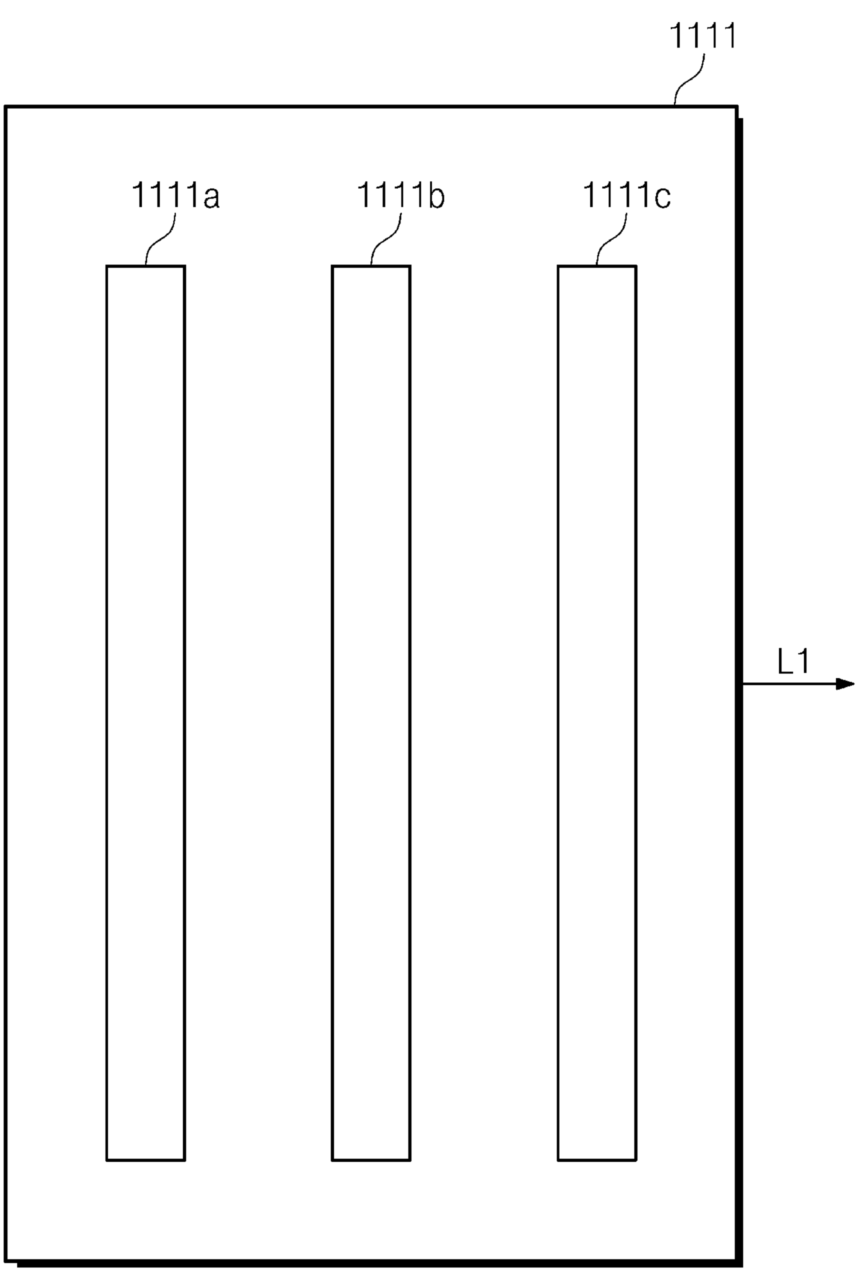
FIG. 4 is a diagram illustrating a configuration of an aperture unit of FIG. 3 according to an embodiment of the present disclosure.

FIG. 4 is a diagram illustrating the light source array 1111 of FIG. 3 according to an embodiment. FIG. 4 will be described with reference to FIGS. 1 and 3. Referring to FIG. 4, the light source array 1111 may include a plurality of light sources. For example, the light source array 1111 may include a first light source 1111*a*, a second light source 1111*b*, and a third light source 1111*c*. For convenience of description and for brevity of drawing, the light source array 1111 including the first light source 1111*a*, the second light source 1111*b*, and the third light source 1111*c* is illustrated in FIG. 4. However, the present disclosure is not limited thereto. For example, the light source array 1111 may include a two or more light sources.

The plurality of light sources may be halogen lamp light sources having different color temperature characteristics. That is, the plurality of light sources may each have a different color temperature characteristic. For example, when the first light source 1111*a* is activated, the first light L1 having a first color temperature may be radiated; when the second light source 1111*b* is activated, the first light L1 having a second color temperature may be radiated; and when the third light source 1111*c* is activated, the first light L1 having a third color temperature may be radiated.

For example, the first light source 1111*a* may be one of a D65 light source radiating a light whose color temperature is 6500K, a D50 light source radiating a light whose color temperature is 5000K, a CWF light source radiating a light whose color temperature is 4150K, a TL84 light source radiating a light whose color temperature is 4000K, an A light source radiating a light whose color temperature is 2850K, or an H light source radiating a light whose color temperature is 2300K.

In an embodiment, each of the plurality of light sources may be a halogen lamp having a cylindrical shape.

At least one light source among the plurality of light sources, including the first light source 1111*a*, the second light source 1111*b*, and the third light source 1111*c*, may be activated based on the first light control signal SC1. The color temperature of the first light L1 radiated by the light source array 1111 may be determined based on the color temperature characteristic of the activated light source. For example, when only the first light source 1111*a* is activated based on the first light control signal SC1, the first light L1 may have the first color temperature. For example, when the first light source 1111*a* and the second light source 1111*b* are activated simultaneously based on the first light control signal SC1, the first light L1 may have a fourth color temperature based on the first color temperature and the second color temperature.

According to an embodiment, the color temperature of the first test light TL1 may be identical to the color temperature of the first light L1. That is, the first light L1 may take the color temperature of the first test light TL1 radiated by the light source array 1111. Accordingly, the first light control signal SC1 may be used to control the light source array 1111 to radiate the first test light TL1 having a certain color temperature, and thereby control a color temperature of the first light L1 radiated by the first light source device 1100.

The test system 1000 according to an embodiment of the present disclosure may use the first light source control signal LC1 to control a light source activated from among the plurality of light sources of the first light source device 1100. As such, the test system 1000 may control the color temperature of the first test light TL1, based on the first light source control signal LC1. For convenience, the description will be given based on the case where only one of the plurality of light sources is activated. However, the present disclosure is not limited thereto, and multiple light sources may be activated simultaneously.

Figure 5:
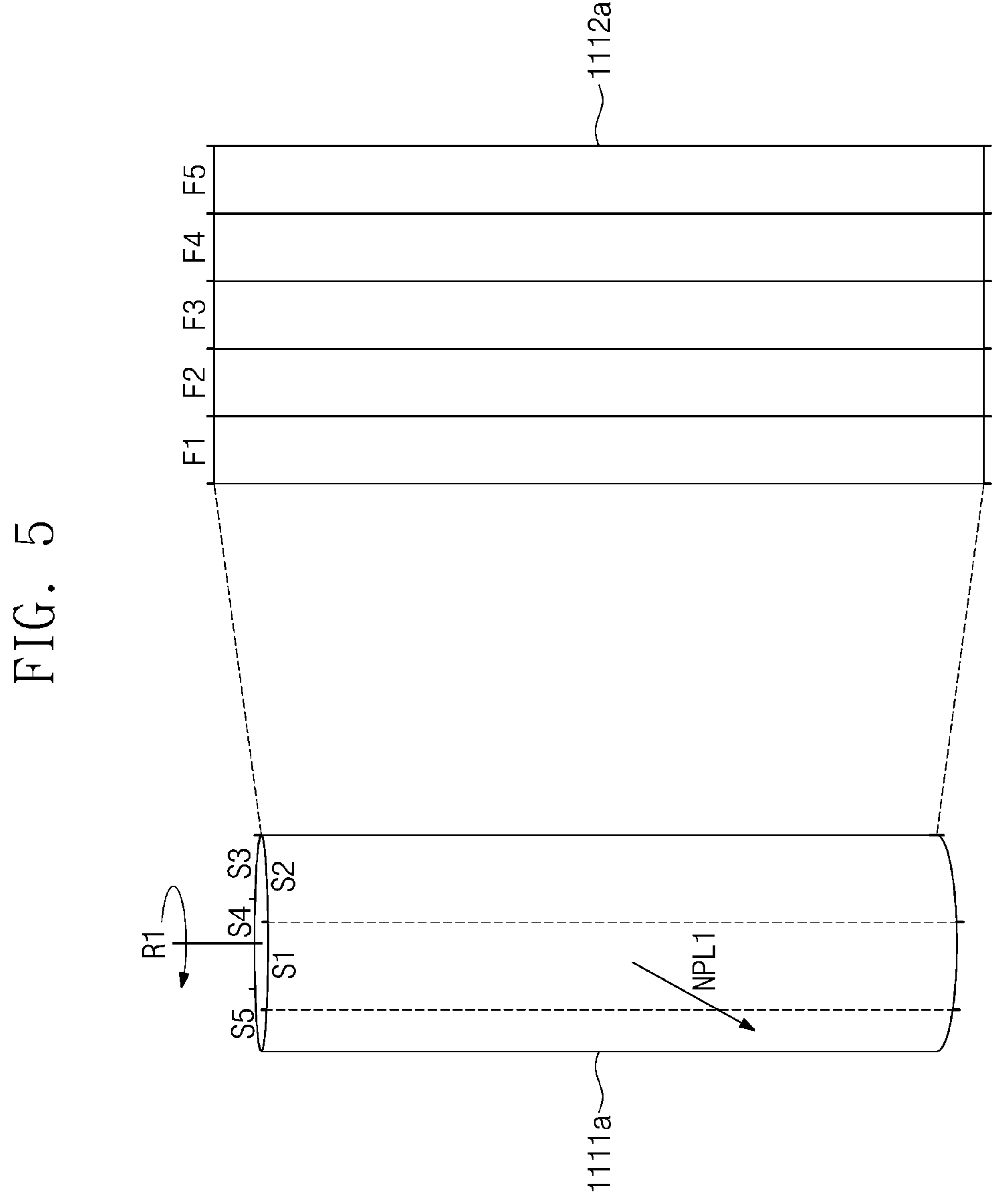
FIG. 5 is a diagram for describing an illuminance control filter unit of FIG. 3 according to an embodiment of the present disclosure.

FIG. 5 is a diagram for describing an illuminance control filter unit of FIG. 3 according to an embodiment. FIG. 5 will be described with reference to FIG. 1, FIG. 3, and FIG. 4. The illuminance control filter unit 1112 of FIG. 3 may include a plurality of illuminance control filters. The plurality of illuminance control filters may be attached to a corresponding light source among the plurality of light sources of FIG. 4. Referring to FIG. 5, for example, a first illuminance control filter 1112*a* may be attached to the first light source 1111*a*.

Each of the plurality of illuminance control filters may include a plurality of ND filters. For example, the first illuminance control filter 1112*a* may include a plurality of ND filters, including a first ND filter F1, a second ND filter F2, a third ND filter F3, a fourth ND filter F4, and a fifth ND filter F5. The first illuminance control filter 1112*a* may be configured such that the plurality of ND filters F1 to F5 made of a flexible material are connected side by side. The first illuminance control filter 1112*a* may be attached to the first light source 1111*a* having the cylindrical shape. The first illuminance control filter 1112*a* may be attached to the first light source 1111*a* while surrounding at least a portion of the first light source 1111*a*. For convenience of description and for brevity of drawing, FIG. 5 shows the first illuminance control filter 1112*a* including 5 ND filters. However, the present disclosure is not limited thereto.

The plurality of ND filters may have different transmittance characteristics. For example, the transmittance of the first ND filter F1 may be less than the transmittance of the second ND filter F2, and the transmittance of the second ND filter F2 may be less than the transmittance of the third ND filter F3. That is, the transmittance of the plurality of ND filters may increase sequentially from the first ND filter F1 to the fifth ND filter F5.

Each of the plurality of ND filters may be a filter that reduces or modifies the intensity of all wavelengths or colors of incident light equally. For example, the first ND filter F1 uniformly modified the intensity of incident light over its entire area. As such, each of the plurality of ND filters may adjust the amount of light independent of a color balance of the incident light. That is, each of the plurality of ND filters may adjust the amount of light while maintaining a color balance of the incident light.

The first light source 1111*a* may have a cylindrical shape and may include a plurality of portions, including a first portion S1, a second portion S2, a third portion, a fourth portion S4, and a fifth portion S5. The plurality of ND filters may be respectively attached to the plurality of portions. For example, the first ND filter F1 may be attached to the first portion 51, the second ND filter F2 may be attached to the second portion S2, the third ND filter F3 may be attached to the third portion S3, the fourth ND filter F4 may be attached to the fourth portion S4, and the fifth ND filter F5 may be attached to the fifth portion S5.

In an embodiment, the first light source 1111*a* may rotate. A portion of the first light source 1111*a* aligned with a first position may radiate light to the outside. For example, the first position may be a position where the first test light TL1 is radiated. Light may not be radiated from other portions of the first light source 1111*a* that may not be aligned with the first position. That is, the other portions of the first light source 1111*a* that may not be aligned with the first position may not be exposed to the outside.

In an embodiment, light may be radiated to the outside only from a portion from among the plurality of portions of the first light source 1111*a* aligned to the first position. The light radiated from the portion of the first light source 1111*a* aligned to the first position may be radiated to the chart changer 1300. In detail, only the portion from among the plurality of portions of the first light source 1111*a* corresponding to the first position may be exposed to the outside of the first light source device 1100.

For example, the first portion S1 among the plurality of portions of the first light source 1111*a* may be placed at the first position. In this case, the illuminance of the first light L1 radiated by the first light source 1111*a* may be adjusted through the first ND filter F1. In this case, the illuminance of the light NPL1 passing through the illuminance control filter unit 1112 may be controlled based on the transmittance of a filter corresponding to the portion aligned with the first position, e.g., the first ND filter F1.

In an embodiment, the first light source 1111*a* may rotate between 0 degrees and 360 degrees around a first axis R1. The transmittance of the ND filter corresponding to the first position may be determined based on a rotation angle of the first light source 1111*a*. The first light source device 1100 may adjust the rotation angle of the first light source 1111*a* based on the first light source control signal LC1.

For example, at a first point in time, the first portion S1 among the plurality of portions of the first light source 1111*a* may be disposed at the first position. As such, at the first point in time, the illuminance of the light NPL1 passing through the illuminance control filter unit 1112 may be determined based on the transmittance of the first ND filter F1. Afterwards, the first light source 1111*a* may rotate, and at a second point in time, the second portion S2 among the plurality of portions of the first light source 1111*a* may be disposed at the first position. As such, at the second point in time, the illuminance of the light NPL1 passing through the illuminance control filter unit 1112 may be determined based on the transmittance of the second ND filter F2. In this case, the transmittance of the second ND filter F2 may be higher than the transmittance of the first ND filter F1. As such, the illuminance of the light NPL1 passing through the illuminance control filter unit 1112 at the second point in time may be greater compared to the illuminance at the first point in time.

In other words, the test system 1000 according to an embodiment of the present disclosure may adjust the rotation angle of each of the light sources (e.g., 1111*a*) of each of the first light source device 1100 and the second light source device 1200. The test system 1000 may select an ND filter to be disposed at the first position, based on a rotation angle of a light source. That is, the test system 1000 may adjust the transmittance of an ND filter through which the first light L1 radiated by the activated light source passes, based on the rotation angle of the light source. As such, the test system 1000 may adjust the illuminance of the test light (e.g., TL1).

For example, the test system 1000 may gradually increase or decrease the illuminance of the first test light TL1 and the second test light TL2 by gradually increasing or decreasing the rotation angle of the light source (e.g., the first light source 1111*a*) of each of the first light source device 1100 and the second light source device 1200.

Figure 6:
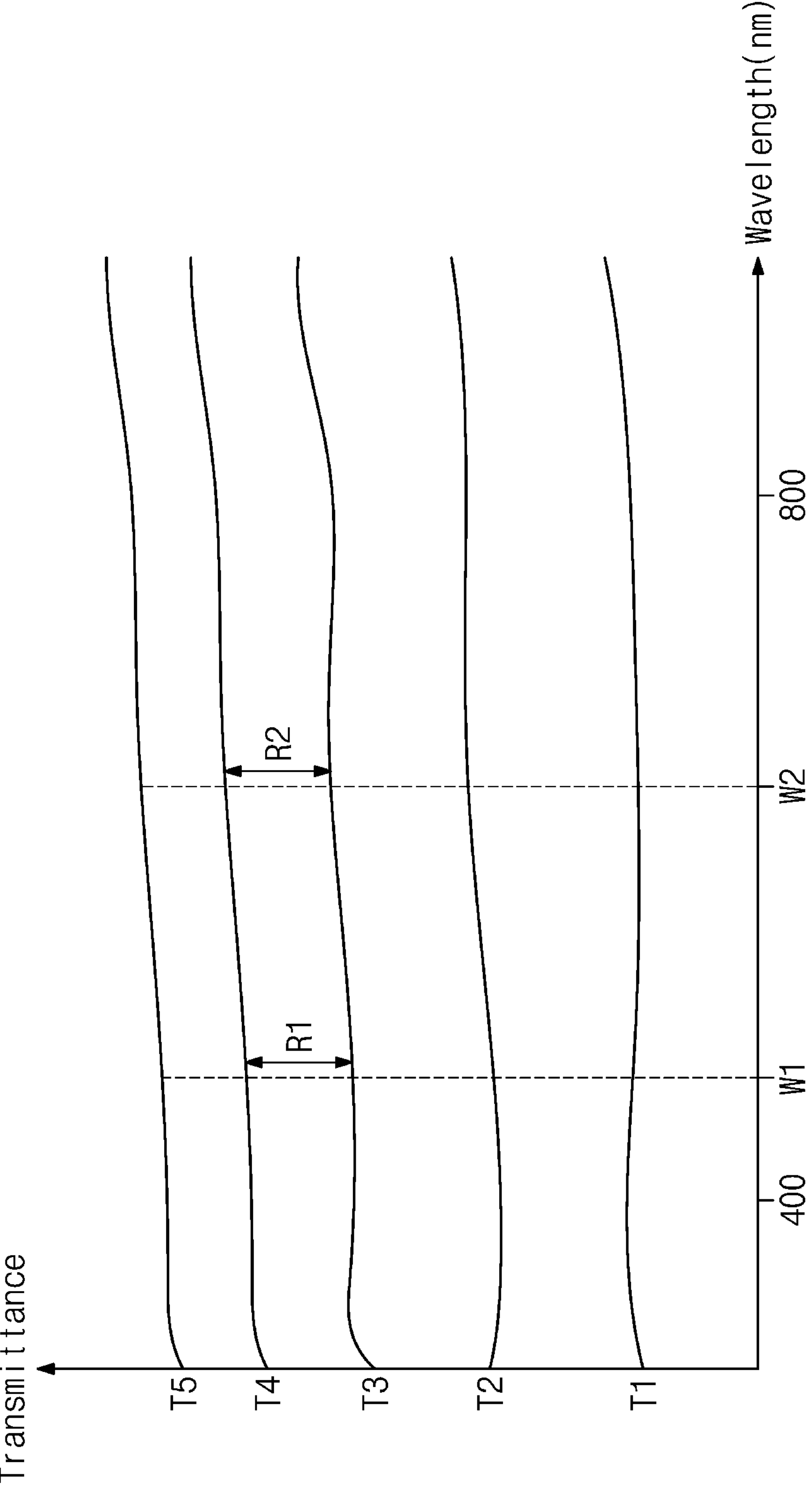
FIG. 6 is a graph illustrating a transmittance change for each wavelength band of an ND filter used in FIG. 5 according to an embodiment of the present disclosure.

FIG. 6 is a graph illustrating a transmittance change for each wavelength band of an ND filter used in FIG. 5. In FIG. 6, a horizontal axis represents a wavelength of a light input to an ND filter, and a vertical axis represents the transmittance of the ND filter. Each of the plurality of ND filters, including the first ND filter F1, the second ND filter F2, the third ND filter F3, the fourth ND filter F4, and the fifth ND filter F5 of FIG. 5 may have the same characteristic as the graph of FIG. 6.

Referring to FIG. 6, the transmittance of the ND filter may be maintained substantially uniformly even though the wavelength of the incident light changes. That is, the ND filter may reduce the amount of light by a uniform amount, with regard to the light of different wavelengths. The color temperature of the light input to the ND filter may be determined based on the wavelength of the input light. Accordingly, the ND filter may reduce the amount of the input light by a given amount based on the transmittance, with the color temperature of the input light maintained.

For example, the transmittance of the ND filter to which a light of a first wavelength W1 is input may be reduced from a fourth transmittance T4 to a third transmittance T3. As such, the transmittance of the ND filter to which the light of the first wavelength W1 is input may be reduced as much as a first decrement R1. For example, the transmittance of the ND filter to which a light of a second wavelength W2 is input may be reduced from the fourth transmittance T4 to the third transmittance T3. As such, the transmittance of the ND filter to which the light of the second wavelength W2 is input may be reduced as much as a second decrement R2. In this case, the first decrement R1 and the second decrement R2 may be substantially equal.

In other words, a change, e.g., a decrement or an increment, of the transmittance according to a change in the transmittance of the ND filter to which the light is input may be uniformly maintained for a range of wavelengths of the light input to the ND filter. Accordingly, the illuminance of the light input to the ND filter may be changed by the same amount across a range of wavelengths by changing the transmittance of the ND filter to which the light is input, regardless of the color temperature of the light input to the ND filter. That is, when the transmittance of the ND filter is changed, the variations in the amount of light passing through the ND filter may be uniform regardless of the color temperature of the light input to the ND filter.

The test system 1000 according to an embodiment of the present disclosure may adjust the illuminance of the light radiated by the light source by using the characteristic of the ND filters described herein. As described with reference to FIG. 5, an illuminance control filter (e.g., first illuminance control filter 1112*a*) including a plurality of ND filters (e.g., the first ND filter F1 to the fifth ND filter F5) may be attached to each of light sources (e.g., the first light source 1111*a* to the third light source 1111*c*) of a light source device (e.g., 1100). The test system 1000 may change the transmittance of the ND filter, through which the light radiated by the light source passes, by rotating the light source. As such, the test system 1000 may adjust the illuminance of each of the first test light TL1 and the second test light TL2.

FIG. 7 is a table for describing examples of an ND filter of FIG. 5. FIG. 7 will be described with reference to FIG. 1, FIG. 3, and FIG. 5. Referring to FIG. 7, an exposure factor refers to a factor for expressing a characteristic of an ND filter. As the exposure factor increases, the transmittance of the ND filter may decrease. For example, as the exposure factor of an ND filter, through which the first light L1 radiated from the light source array 1111 passes, from among a plurality of ND filters increases, the decrement of the illuminance of the first light L1 may increase.

The transmittance refers to an index for indicating how much the ND filter transmits a light input thereto. For example, as the transmittance of the ND filter through which the light radiated by the light source passes decreases, the amount of light passing through the ND filter may decrease. That is, as the transmittance of the ND filter through which the light radiated by the light source passes decreases, the illuminance of the light passing through the ND filter may decrease.

F-stop reduction refers to an index associated with how much the amount of light passing through the ND filter decreases. As a value of the F-stop reduction becomes greater, the amount of light passing through the ND filter may decrease.

In an embodiment, the exposure factors of the ND filters, including the first ND filter F1 to the fifth ND filter F5, of the first illuminance control filter 1112*a* of FIG. 5 may be different from each other. For example, the exposure factor of the first ND filter F1 may be 2.5 (ND 2.5); the exposure factor of the second ND filter F2 may be 2 (ND 2); the exposure factor of the third ND filter F3 may be 1.5 (ND 1.5); the exposure factor of the fourth ND filter F4 may be 1.4 (ND 1.4); and the exposure factor of the fifth ND filter F5 may be 1.3 (ND 1.3). That is, the ND filters may have different transmittance. Accordingly, the test system 1000 may adjust the illuminance of the light NPL1 passing through the illuminance control filter unit 1112 by adjusting the rotation angle of the first light source 1111*a*. However, the present disclosure is not limited thereto.

In an embodiment, the first illuminance control filter 1112*a* may include a plurality of ND filters respectively having the exposure factors illustrated in FIG. 6. In other words, the first illuminance control filter 1112*a* of FIG. 5 may include 18 ND filters, each having a different transmittance. In this case, the first light source 1111*a* may include 18 portions. For example, the exposure factor of the ND filter attached to the first portion may be 1024 (ND 1024), and the exposure factor of the ND filter attached to the 18th portion may be 1 (ND 1). Accordingly, the test system 1000 may adjust the illuminance of the first light L1 in 18 stages.

Figure 8:
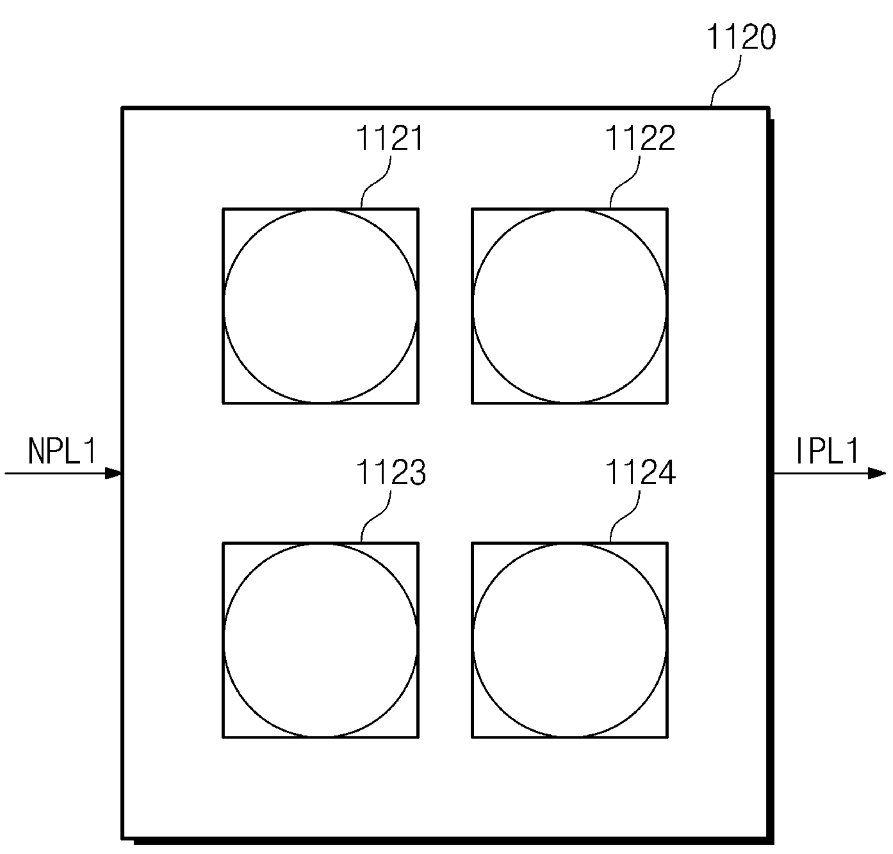
FIG. 8 is a diagram illustrating a configuration of an aperture unit of FIG. 3 in detail according to an embodiment of the present disclosure.

FIG. 8 is a diagram illustrating a configuration of an aperture unit of FIG. 3 according to an embodiment. FIG. 8 will be described with reference to FIG. 1, FIG. 3, FIG. 4, and FIG. 5. Referring to FIG. 8, the aperture unit 1120 may include a plurality of apertures 1121 to 1124. For convenience of description and for brevity of drawing, an example in which the aperture unit 1120 of FIG. 7 includes the four apertures 1121 to 1124 is illustrated. Also, for convenience, the description will be given based on the case where the first light source 1111*a* is activated to radiate the first light L1 and the first ND filter F1 is placed at the first position as illustrated in FIG. 5. However, the present disclosure is not limited thereto.

In an embodiment, the aperture unit 1120 may include 80 apertures.

Each of the plurality of apertures 1121 to 1124 may be an aperture stop. For example, the light NPL1 passing through the first illuminance control filter 1112*a* may be input to the aperture unit 1120. The first light source device 1100 may adjust an aperture ratio of each of the plurality of apertures 1121 to 1124, based on the first aperture control signal IC1. As such, the illuminance of the light IPL1 passing through the aperture unit 1120 may be adjusted.

For example, when the aperture ratios of the plurality of apertures 1121 to 1124 decrease, the illuminance of the light IPL1 passing through the aperture unit 1120 may decrease. For example, when the aperture ratios of the plurality of apertures 1121 to 1124 increase, the illuminance of the light IPL1 passing through the aperture unit 1120 may increase.

In an embodiment, each of the plurality of apertures 1121 to 1124 may be, for example, an iris aperture. In the case of iris apertures, each of the plurality of apertures 1121 to 1124 may adjust the area through which the light NPL1 passing through the first illuminance control filter 1112*a* is radiated. Accordingly, each of the plurality of apertures 1121 to 1124 may adjust the illuminance of the light NPL1 passing through the first illuminance control filter 1112*a* while reducing or minimizing a light aggregation phenomenon.

Figures 9, 10:
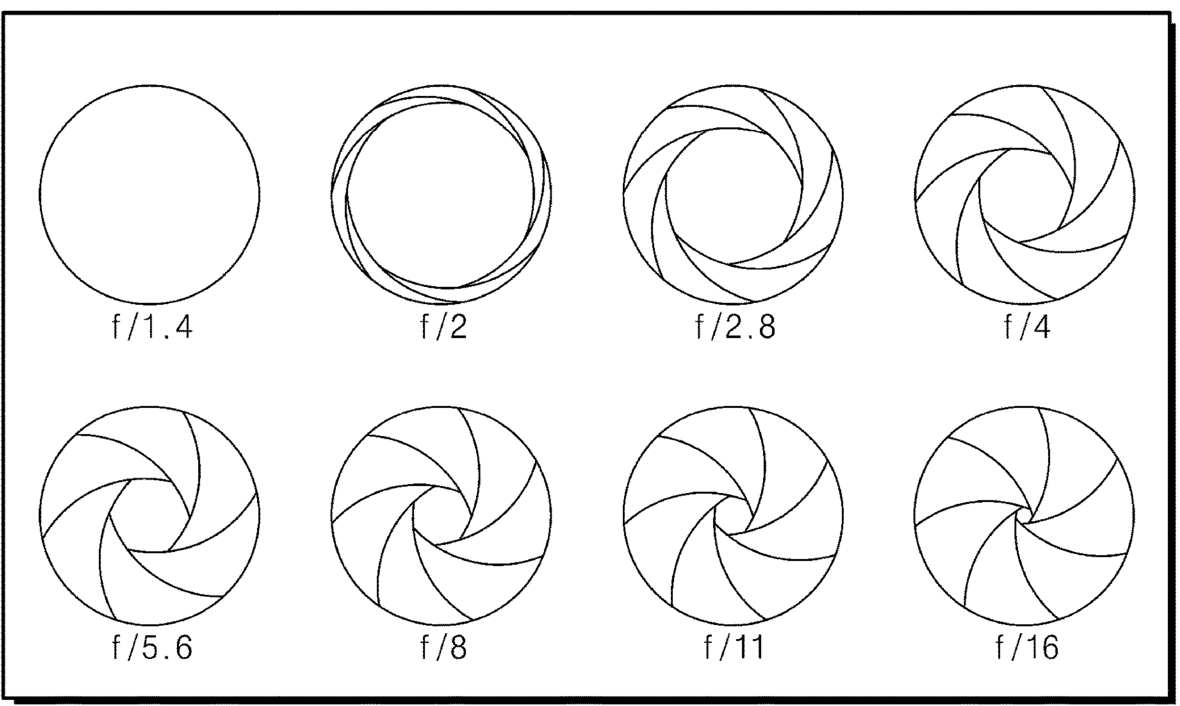
FIG. 9 is a diagram for describing a way to adjust adjustment ratios of apertures of FIG. 8 according to an embodiment of the present disclosure.
FIG. 10 is a table for describing examples of an illuminance adjustment result according to an embodiment of the present disclosure.

FIG. 9 is a diagram for describing an example of a way to adjust adjustment ratios of apertures of FIG. 8. FIG. 9 will be described with reference to FIG. 8. In an embodiment, referring to FIG. 9, the aperture ratio of each of the plurality of apertures 1121 to 1124 may be determined based on the f-stop. For example, as the f-stop increases, the aperture ratio of each of the plurality of apertures 1121 to 1124 may decrease.

In an embodiment, in the case of adjusting the illuminance of the light NPL1 passing through the illuminance control filter unit 1112, the aperture ratio of each aperture of the plurality of apertures 1121 to 1124 may be different from each other. For example, the f-stop of a first aperture 1121 and a third aperture 1123 may be "4", and the f-stop of a second aperture 1122 and a fourth aperture 1124 may be "8". The illuminance of the light IPL1 passing through the aperture unit 1120 may be adjusted by adjusting the aperture ratios of the plurality of apertures 1121 to 1124 individually.

As the aperture ratio of each of the apertures 1121 to 1124 decreases, the area through which the light IPL1 passing through the aperture unit 1120 is radiated may decrease. That is, as the aperture ratio of each of the apertures 1121 to 1124 decreases, the surface light source may change to a polarized light source. In this case, the light uniformity of the light IPL1 passing through the aperture unit 1120 may decrease.

According to an embodiment, each of the first light source device 1100 and the second light source device 1200 may include a diffuser (e.g., 1130) as described with reference to FIG. 3. The diffuser (e.g., 1130) may scatter the light IPL1 passing through the aperture unit 1120 to emit diffused light, that is, the light TL1. As such, the light uniformity of the first test light TL1 and the second test light TL2 passing through the diffuser 1130 may increase.

FIG. 10 is a table for describing examples of an illuminance adjustment result according to an embodiment of the present disclosure. FIG. 10 will be described with reference to FIG. 1, and FIGS. 3 to 9. FIG. 10 is described based on the case where the first light source 1111*a* of FIG. 4 is activated and radiates the first light L1, as described with reference to FIG. 5.

Referring to FIG. 10, in an embodiment, an illuminance value of the first light L1 may be expressed in units of Lux. When the first ND filter F1 among the plurality of ND filters, including the first ND filter F1 to the fifth ND filter F5, of the first illuminance control filter 1112*a* may be placed at the first position, the illuminance value of the light NPL1 passing through the first ND filter F1 may be 700 Lux. In this case, the illuminance value of the light NPL1 passing through the first ND filter F1 may be controlled based on the transmittance of the first ND filter F1.

When the second ND filter F2 among the plurality of ND filters is placed at the first position, the illuminance value of the light NPL1 passing through the second ND filter F2 may be 750 Lux. In this case, the illuminance value of the light NPL1 passing through the second ND filter F2 may be controlled based on the transmittance of the second ND filter F2.

When the third ND filter F3 among the plurality of ND filters is placed at the first position, the illuminance value of the light NPL1 passing through the third ND filter F3 may be 1000 Lux. In this case, the illuminance value of the light NPL1 passing through the third ND filter F3 may be controlled based on the transmittance of the third ND filter F3.

For example, the exposure factor of the first ND filter F1 may be 1.4, the exposure factor of the second ND filter F2 may be 1.3, and the exposure factor of the third ND filter F3 may be 1.

Returning to FIG. 9, when the light NPL1 passing through the first ND filter F1 passes through the aperture unit 1120, the f-stop of the even-numbered apertures, including the second aperture 1122 and the fourth aperture 1124, may be greater than 4 and less than 5.6, and the f-stop of the odd-numbered apertures, including the first aperture 1121 and the third aperture 1123, may be 4. In this case, the illuminance of the light IPL1 passing through the aperture unit 1120 may be greater than 600 Lux and less than 700 Lux.

In an example in which the second ND filter F2 is disposed at the first position, when the light NPL1 passing through the second ND filter F2 passes through the aperture unit 1120, the f-stop of the plurality of apertures 1121 to 1124 may be greater than 2 and less than 4. In this case, the illuminance of the light IPL1 passing through the aperture unit 1120 may be greater than 700 Lux and less than 750 Lux.

In an example in which the third ND filter F3 is disposed at the first position, when the light NPL1 passing through the third ND filter F3 passes through the aperture unit 1120, the f-stop of the even-numbered apertures, including the second aperture 1122 and the fourth aperture 1124, may be greater than 2 and less than 4, and the f-stop of the odd-numbered apertures, including the first aperture 1121 and the third aperture 1123, may be 2. In this case, the illuminance of the light IPL1 passing through the aperture unit 1120 may be greater than 705 Lux and less than 849 Lux.

As described above, the test system 1000 according to an embodiment of the present disclosure may decrease the illuminance of the first light L1 within a range by using the illuminance control filter unit 1112. The test system 1000 may adjust the illuminance of the light NPL1 passing through the illuminance control filter unit 1112 by adjusting the aperture ratio of each of the plurality of apertures of the aperture unit 1120. In this way, the test system 1000 may adjust the illuminance of the first test light TL1. That is, the test system 1000 may adjust the illuminance of the signal light SL input to the image device 1400.

In addition, the test system 1000 may adjust the position of the first light source device 1100. By adjusting the position of the first light source device 1100, the test system 1000 may adjust the illuminance of the signal light SL input to the image device 1400. Through methods described herein, the test system 1000 according to an embodiment of the present disclosure may adjust the illuminance of the signal light SL input to the image device 1400 independent of the power that is supplied to the first light source device 1100 and the second light source device 1200.

Figure 11:
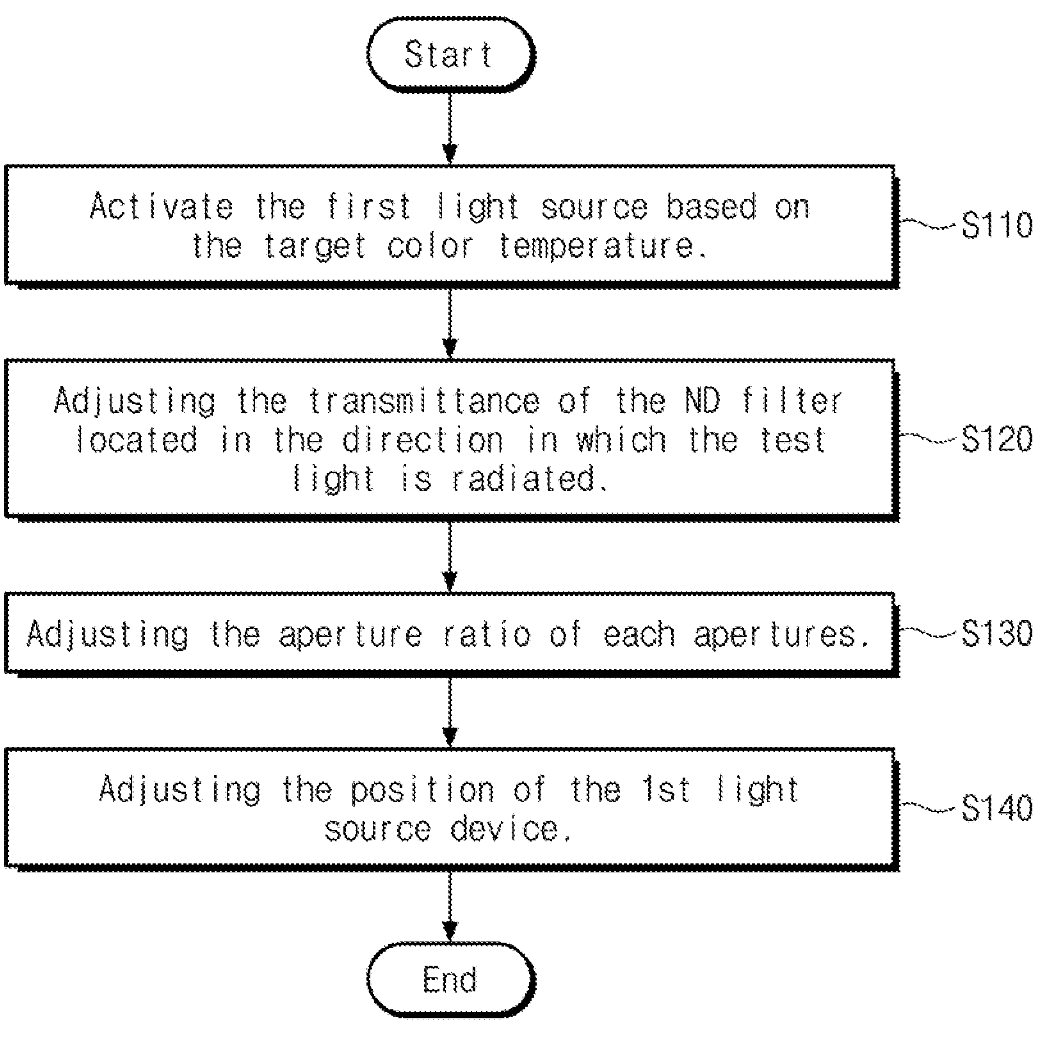
FIG. 11 is a flowchart for describing an operation method of a test system according to an embodiment of the present disclosure.

FIG. 11 is a flowchart for describing an operation method of a test system according to an embodiment of the present disclosure. FIG. 11 will be described with reference to FIG. 1 and FIGS. 3 to 9. FIG. 11 depicts an example method of controlling the first light source device 1100 of FIG. 1, but the second light source device 1200 may also be controlled in the same scheme as the first light source device 1100.

Referring to FIG. 11, in operation S110, the test system 1000 may activate the first light source 1111*a* among the plurality of light sources of the light source array 1111 of the first light source device 1100. The first light source 1111*a* may be selected for activation based on the target color temperature of the first test light TL1. The first light source 1111*a*, thus activated, may radiate the first light L1.

In operation S120, the test system 1000 may rotate the first light source 1111*a*. As such, one of the plurality of ND filters of the first illuminance control filter 1112*a* attached to the first light source 1111*a* may be disposed at the first position. For example, the first position may be a position where the first test light TL1 may be radiated to the outside. For example, the rotation angle of the first light source 1111*a* may be determined based on the target illuminance. The ND filter may be disposed to face a direction where the first light L1 may be radiated to the aperture unit. The first light L1 may pass through the ND filter disposed at the first position. Accordingly, the amount of the first light L1 may be adjusted based on the transmittance of the ND filter disposed at the first position. That is, the illuminance of the first light L1 may be adjusted. In other words, the test system 1000 may adjust the illuminance of the first light L1 by selecting the ND filter to be disposed at the first position, wherein the ND filter has a certain transmittance.

In operation S130, the test system 1000 may adjust the aperture ratio of each of the plurality of apertures of the aperture unit 1120 of the first light source device 1100. The aperture ratio of each of the plurality of apertures may be selected based on the target illuminance. The amount of the light NPL1 passing through the illuminance control filter unit 1112 may be adjusted based on the aperture ratio of each of the plurality of apertures. As such, the illuminance of the light NPL1 passing through the illuminance control filter unit 1112 may be adjusted. For example, each of the plurality of apertures may be an iris aperture.

For example, the light IPL1 passing through the aperture unit 1120 may pass through the diffuser 1130. The diffuser 1130 may scatter the light IPL1 passing through the aperture unit 1120 so that the light may be uniformly diffused. The light passing through the diffuser 1130 may be the first test light TL1.

In operation S140, the test system 1000 may move the first light source device 1100. The test system 1000 may move the first light source device 1100 based on the direction in which the first test light TL1 is radiated. The first light source device 1100 may be moved closer to the chart changer 1300 or farther from the chart changer 1300. The position of the first light source device 1100 may be determine the target illuminance.

As the test system 1000 operates based on the above operations, the illuminance of the first test light TL1 may be adjusted. As such, the illuminance of the signal light SL input to the image device 1400 may be adjusted.

In an embodiment, while the illuminance of the signal light SL input to the image device 1400 is adjusted, the test system 1000 may uniformly maintain the magnitude of the power supplied to the first light source device 1100. That is, the test system 1000 according to an embodiment of the present disclosure may adjust the illuminance of the signal light SL input to the image device 1400 independent of the magnitude of the power supplied thereto.

In the above embodiments, components according to the present disclosure may be described by using the terms "first", "second", "third", etc. However, the terms "first", "second", "third", etc. may be used to distinguish components from each other and do not limit the present disclosure. For example, the terms "first", "second", "third", etc. may not involve an order or a numerical meaning of any form.

According to an embodiment of the present disclosure, the illuminance of the light for testing an image sensor may be adjusted in a state where a power provided to a light source device is uniformly maintained.

In this case, only the illuminance of the light radiated by the light source may be adjusted in a state where a unique color temperature characteristic of the light source is maintained. Accordingly, a light source device with improved performance, a test system including the same, and an operation method thereof are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A test system for an image sensor, comprising:

a first light source device configured to radiate a first test light based on a first control signal;

a chart changer;

an image sensor configured to obtain image information based on the first test light reflected by the chart changer;

a power provider configured to supply a power to the first light source device; and a control circuit configured to generate the first control signal, wherein the first light source device includes:

a first light source configured to radiate the first test light;

a plurality of neutral-density (ND) filters, including a first ND filter disposed to adjust an illuminance of the first test light; and an aperture unit, including a plurality of apertures, configured to adjust the illuminance of the first test light received from the first ND filter based on an aperture ratio of each of the plurality of apertures, and wherein the illuminance of the first test light is adjusted independent of the power supplied to the first light source device by the power provider, and wherein, while the first test light having a first color temperature is adjusted, a magnitude of the power supplied to the light source device is uniformly maintained, wherein the first light source device is further configured to be movable in a first direction toward the chart changer or in a second direction opposite to the first direction, and wherein the illuminance of the first test light increases as the first light source device moves closer to the chart changer, wherein the first light source device includes a plurality of light sources including the first light source, and each of the plurality of light sources is rotatable individually by the control circuit, wherein the first ND filter is one of the plurality of ND filters, is disposed at a first position where the first test light is radiated toward the chart changer, wherein the first light source comprises a plurality of portions and is rotatable around a first axis, wherein each of the plurality of ND filters is attached to a corresponding one of the portions of the plurality of portions, wherein the first light source is further configured to rotate, based on the first control signal, to locate one of the plurality of ND filters at the first position as the first ND filter, and wherein each of the plurality of ND filters have a different transmittance.

2. The test system of claim 1, wherein the first light source is activated based on the first control signal, and wherein the first color temperature of the first test light is determined based on a characteristic of the first light source.

3. The test system of claim 1, wherein each of the plurality of apertures is an iris aperture.

4. The test system of claim 1, wherein the first light source device further comprises a diffuser configured to diffuse the first test light received from the aperture unit.

5. A light source device comprising:

a plurality of light sources including a first light source configured to radiate a first light toward a chart changer;

a plurality of neutral-density (ND) filters including a first ND filter attached to the first light source and configured to adjust the first light;

an aperture unit including a plurality of apertures configured to adjust the first light received from the first ND filter; and a diffuser configured to diffuse the first light received from the aperture unit and to radiate the first light for testing an image sensor, wherein an illuminance of the first light is adjusted based on a transmittance of the first ND filter and an aperture ratio of each aperture of the plurality of apertures, wherein, while the first light having a first color temperature is adjusted, a magnitude of a power supplied to the light source device is uniformly maintained, wherein the light source device is further configured to be movable in a first direction toward the chart changer or in a second direction opposite to the first direction, wherein the illuminance of the first light increases as the light source device moves closer to the chart changer, wherein each of the plurality of light sources is rotatable individually, wherein the first ND filter is one of the plurality of ND filters, is disposed at a first position where the first light is radiated toward the chart changer, wherein the first light source comprises a plurality of portions and is rotatable around a first axis, wherein each of the plurality of ND filters is attached to a corresponding one of the portions of the plurality of portions, wherein the first light source is further configured to rotate, based on the first control signal, to locate one of the plurality of ND filters at the first position as the first ND filter, and wherein each of the plurality of ND filters have a different transmittance.

6. The light source device of claim 5, wherein the plurality of light sources have different color temperature characteristics.

7. The light source device of claim 5, wherein each aperture of the plurality of apertures is an iris aperture, and wherein each of the plurality of apertures has a different aperture ratio.

8. The light source device of claim 5, wherein the light source device is supplied with the power, wherein a color temperature of the first light radiated by the diffuser is the first color temperature.

9. A method of operating a test system, which includes a light source device radiating a test light toward a chart charger, the method comprising:

activating a first light source to radiate a first light among a plurality of light sources included in the light source device, based on a target color temperature;

placing a first neutral-density (ND) filter among a plurality of ND filters attached to the first light source at a first position where the test light is radiated, based on a target illuminance;

adjusting an aperture ratio of each of a plurality of apertures included in the light source device, based on the target illuminance; and adjusting a position of the light source device, based on the target illuminance, wherein, while the first light source radiates the test light of the target color temperature, a magnitude of a power supplied to the first light source is uniformly maintained, wherein the adjusting the position of the light source device comprises moving the light source device in a first direction toward the chart changer or in a second direction opposite to the first direction, wherein an illuminance of the test light increases as the light source device moves closer to the chart changer, wherein the first light source comprises a plurality of portions, wherein each ND filter of the plurality of ND filters has a different transmittance and is respectively attached to one of the portions of the plurality of portions, wherein the placing of the first ND filter at the first position where the test light is radiated includes:

rotating the first light source to align a portion of the first light source to which the first ND filter is attached with the first position, and wherein the illuminance of the test light is adjusted based on the transmittance of the first ND filter.

10. The method of claim 9, further comprising:

after the test light is radiated by the first ND filter to the plurality of apertures, diffusing, at a diffuser included in the light source device, the test light received from the plurality of apertures such that uniformity of the test light increases.

* * * * *